March 20, 1962  S. C. CLARK  3,026,117
AMUSEMENT DEVICE
Filed Aug. 4, 1960  2 Sheets-Sheet 1
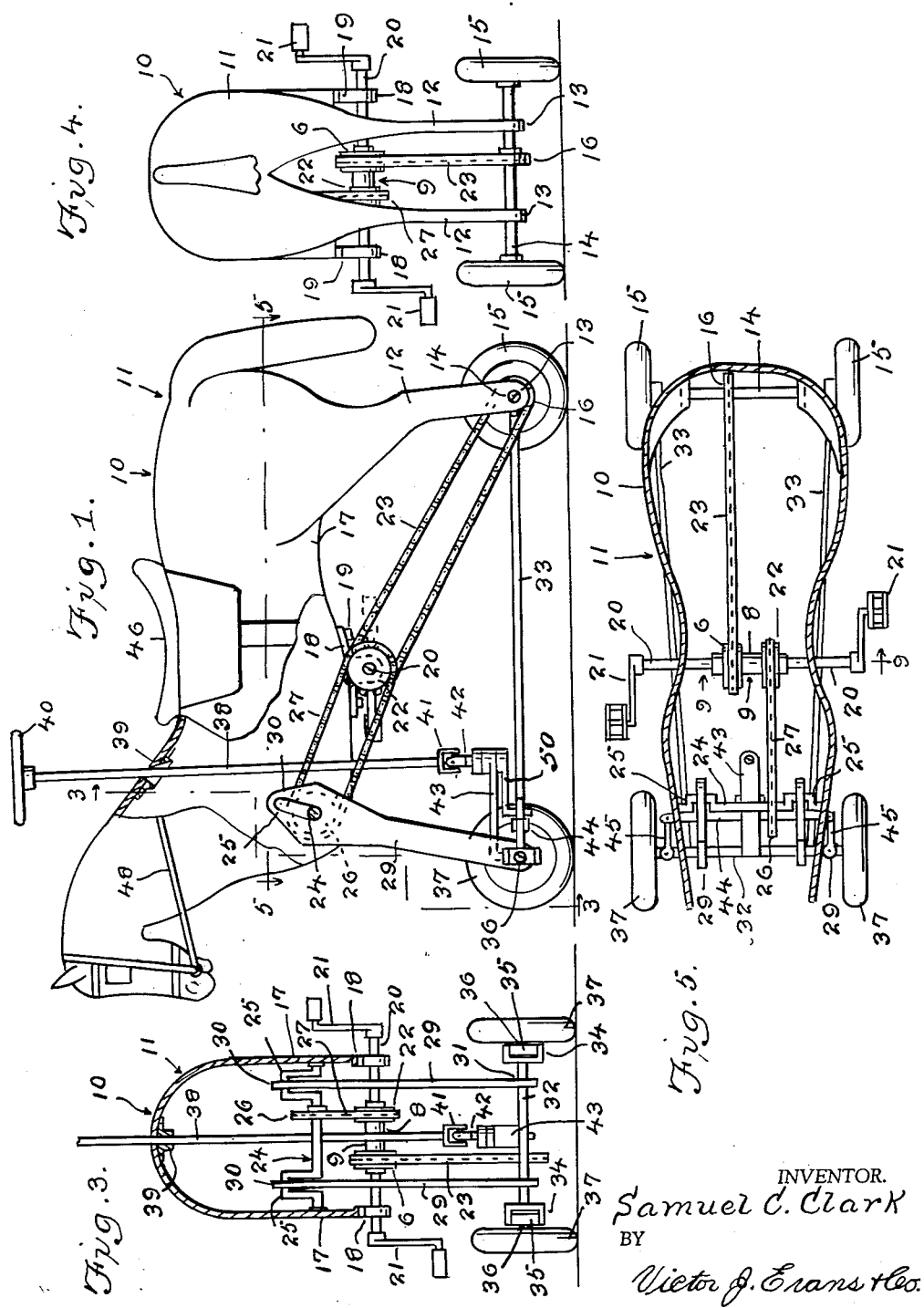
INVENTOR.
Samuel C. Clark
BY
Victor J. Evans & Co.
ATTORNEYS

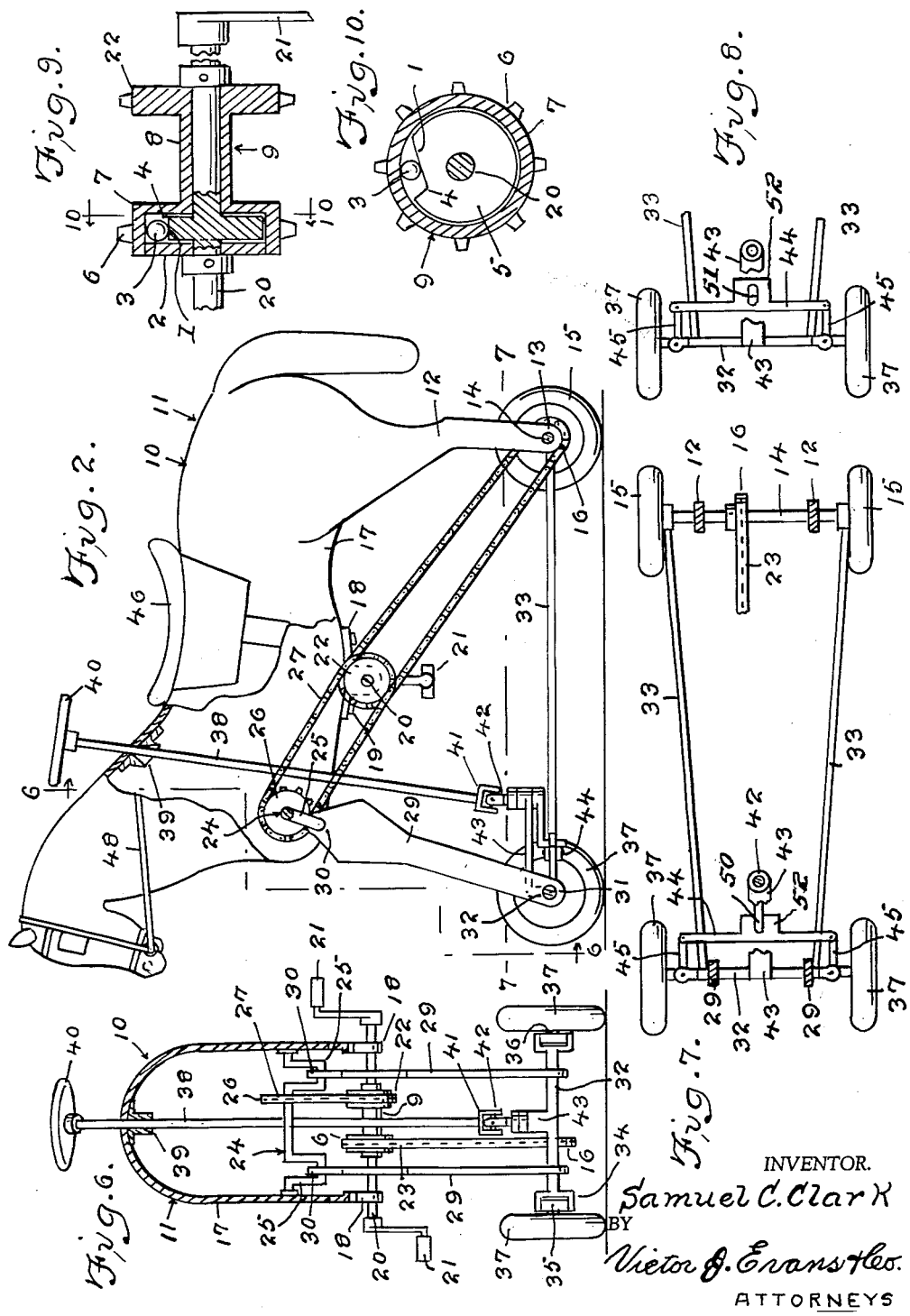

United States Patent Office 3,026,117
Patented Mar. 20, 1962

3,026,117
AMUSEMENT DEVICE
Samuel C. Clark, 13209 Crocker Ave.,
Los Angeles 61, Calif.
Filed Aug. 4, 1960, Ser. No. 47,498
5 Claims. (Cl. 280—1.194)

This invention relates to an amusement device for a child, and more particularly to a wheeled amusement device which is adapted to have a fanciful configuration or formation so as to resemble an animal such as a horse.

The object of the invention is to provide an amusement device which is adapted to be sat upon and operated by a child so that a child can propel himself or herself in a direction, and wherein the main body portion of the device will move up and down so as to simulate the gait or galloping of an animal such as a horse in motion.

Another object of the invention is to provide an amusement device which includes a novel means for causing rocking movement of the body member of the device, and wherein there is also provided a unique propelling means as well as a highly efficient steering mechanism.

A further object of the invention is to provide an amusement device which is extremely simple and inexpensive to manufacture.

Other objects and advantages will be apparent during the course of the following description.

In the accompanying drawings, forming a part of this application, and in which like numerals are used to designate like parts throughout the same:

FIGURE 1 is a side elevational view, with parts broken away and in section, and illustrating the amusement device of the present invention, and showing the device in lowered or down position.

FIGURE 2 is a view similar to FIGURE 1, but showing the device in raised position.

FIGURE 3 is a sectional view taken on the line 3—3 of FIGURE 1.

FIGURE 4 is a rear elevational view, with parts broken away.

FIGURE 5 is a sectional view taken on the line 5—5 of FIGURE 1.

FIGURE 6 is a sectional view taken on the line 6—6 of FIGURE 2.

FIGURE 7 is a sectional view taken on the line 7—7 of FIGURE 2.

FIGURE 8 is a fragmentary view illustrating certain constructional details of the present invention.

FIGURE 9 is a sectional view taken on the line 9—9 of FIGURE 5.

FIGURE 10 is a sectional view taken on the line 10—10 of FIGURE 9.

Referring in detail to the drawings, the numeral 10 indicates the amusement device or cycle horse of the present invention which is shown to comprise a hollow body member 11 that is shaped to resemble a fanciful object such as an animal which may be a horse, and the body member 11 is adapted to be made hollow as for example as shown in the drawings. The body member 11 is provided with depending spaced apart rear legs 12 and the legs 12 have bearings 13 on their lower ends. The numeral 14 indicates a rear axle which extends through the bearings 13 on the lower ends of the rear legs 12, and ground engaging wheels 15 are mounted on the ends of the axle 14.

As shown in the drawings, a sprocket 16 is suitably fastened to the intermediate portion of the rear axle 14, and the numeral 17 indicates spaced apart side portions of the body member 11. As shown in the drawings, a pair of brackets 18 are secured to the lower ends of the side portions 17 in any suitable manner, as for example by means of securing elements 19, and the pair of brackets 18 provide a support for a rotary shaft 20, and the shaft 20 has foot pedals 21 on the ends thereof for engagement by the child's feet. The numeral 9 indicates an over-riding or over-running clutch which includes a sprocket 22, FIGURE 9, and the clutch 9 also includes a sleeve portion 8, and formed integral with the sleeve portion 8 or secured thereto is a casing 7 which has teeth thereon that provide or define a sprocket 6. A cam 5 is formed integral with the shaft 20 or secured thereto, and the cam 5 has a notch or cutout 4 for co-action with a ball 3, and a cover or retainer 2 is arranged as shown in FIGURE 9. The numeral 23 indicates an endless chain which is trained over the sprocket 6, and the chain 23 is also trained over the sprocket 16 on the rear axle 14.

The numeral 24 indicates a crank which is journaled between the side portions 17 of the body member 11, and the crank 24 is provided with a pair of offset portions 25 for a purpose to be later described. A drive means consisting of a sprocket 26 is mounted on the crank 24, and an endless chain 27 is trained over the sprocket 26, and the chain 27 is also trained over the corresponding sprocket 22 on the shaft 20.

The numeral 29 designates each of a pair of spaced apart front legs which have bearings 30 on their upper ends, and the bearings 30 are swivelly connected to the offset portions 25 of the crank 24. The lower ends of the legs 29 are provided with apertures or bearings 31 through which extends a front axle 32. The numeral 33 designates each of a pair of frame members which extend between the front and rear axles, as for example as shown in FIGURE 7. The ends of the front axle 32 are bifurcated as at 34, and pins 35 are rotatably supported in the bifurcated portions 34 and this construction forms part of a steering mechanism for the front wheels 37, and the front wheels 37 are suitably connected to stub shafts 36 which are affixed to the pins 35. The numeral 38 indicates a steering rod which is generally vertically disposed, and the steering rod 38 extends through a recess or cutaway bearing portion 39 in the upper front portion of the body member 11, and a steering wheel 40 is suitably affixed to the upper end of the rod 38. The numeral 41 indicates a universal joint which connects the lower end of the rod 38 to a shaft 42, and the shaft 42 extends through a bearing 43, the lower end of the shaft 42 being suitably affixed to a crank 50, and the crank 50 engages a slot 51 in a projection 52 on the movable cross piece 44, and the ends of the cross piece 44 are connected by links 45 to the pins 35. This arrangement serves to insure that by turning the steering wheel 40 the front wheels 37 can be turned in order to guide or steer the device 10, and in addition the construction provides a slidable connection between the rocking body member 11 and the rod 38 so that regardless of whether the body member 11 is in an upper or lower position, the steering mechanism can still be operated. Suitable clearance is provided in the recessed portion 39 so as to provide that there will be no jamming or binding between the body member and the rod 38 in the various different positions of the body member.

As shown in the drawings, a saddle 46 may be provided for the member 11, and the saddle 46 may be adjustable as desired.

From the foregoing, it is apparent that there has been provided an amusement device which is in the form of a wheeled toy or the like, and in use the child is adapted to sit on the saddle or seat portion 46 and grip the steering wheel 40 and the feet of the child engage the foot pedals 21. Then, with the parts arranged as shown in the drawings, by moving the feet the child will cause the pedals 21 to turn or move and this in turn will rotate the shaft 20. As the shaft 20 turns as for example in a counter clockwise direction, FIGURE 10, the surface 1 will cause the ball 3 to wedge against the inner surface of the casing 7 so that the sprocket 6 will be rotated or turned, and with the chain 23 trained over the sprocket 6 and with the chain 23 also trained over the sprocket 16 on the rear axle 14, it will be seen that this rotation of the shaft 20 by the foot pedals 21 will cause the rear axle 14 to turn and since the wheels 15 are connected to the ends of the rear axle 14, the rear wheels 15 will cause the device to be propelled or moved along a sidewalk or other area in the desired direction.

At the same time, this rotation of the shaft 20 will cause the sprocket 22 to be turned or rotated, and since the chain 27 is trained over the sprocket 22 and since the chain 27 is also trained over the sprocket 26 on the crank 24, it will be seen that the crank 24 will be rotated by action of the foot pedals 21. In view of the fact that the crank 24 includes a pair of offset portions 25, and with the bearings 30 on the upper ends of the front legs 29 swivelly connected to the offset portions 25, and with the lower bearing portions 31 of the legs 29 engaging the front axle 32, it will be seen that as the crank 24 is rotated or turned, the body member 11 will rock back and forth or up and down as for example from the position shown in FIGURE 1 to the position shown in FIGURE 2 or vice versa, so that the child seated on the saddle 46 will have the experience of riding on a real horse in view of the fact that this motion will simulate galloping or up and down movement of the horse's body.

In addition, the child can conveniently grip the steering wheel 40 so as to turn the rod 38, and as the rod 38 is turned, the universal joint 41 will move the shaft 42, and since the shaft 42 is connected to the cross piece 44, it will be seen that the cross piece 44 will be moved so as to move the links 45 which in turn will move the pins 35 in the bifurcated portions 34 so as to turn the front wheels 37. Thus, this action can be used to turn or guide the wheels 37 whereby the device 10 can be conveniently steered as desired. The device is constructed so as to provide the sliding connection between the rod 38 and the bearing portion 39 so that the body member 11 can move up and down on the rod 38 and still not interfere with use of the steering wheel 40 for guiding the present invention.

The parts can be made of any suitable material and in different shapes or sizes.

While the present invention has been illustrated and described as resembling an animal such as a horse, it is to be understood that it can be made to resemble other types of members such as fanciful creatures or the like.

As shown in the drawings, the device may be provided with a bridle and reins as indicated by the numeral 48, FIGURE 1. In addition the member may be attractively and suitably colored or designed so as to enhance the attractiveness thereof and to increase the pleasure and amusement derived therefrom.

Thus, the toy or amusement device of the present invention will simulate a horse and will simulate the galloping of a horse as the device moves along a street or the like. Braces, ball bearings or the like can be used wherever desired or required. The pedals may be provided with suitable ball bearings, or the over-riding clutch 9, so that after the device has once been started by foot pressure and given sufficient momentum, the horse will continue to move or gallop for a considerable distance without applying further power to the pedals, and the clutch 9 may be of conventional construction. Thus, the clutch may be of the type so that after the device has been started and given sufficient momentum, the pedals 21 may be held steady or stationary and the device will operate without applying additional power to the pedals 21, and wherein the rocking or up and down movement of the body member will continue to occur even with no additional foot power being supplied to the pedals 21, as long as the device has sufficient momentum, to continue its forward motion.

Minor changes in shape, size and rearrangement of details coming within the field of invention claimed, may be resorted to in actual practice, if desired.

What is claimed is:

1. In an amusement device, a hollow body member including a pair of spaced apart depending rear legs having bearings on their lower ends, a rear axle extending through said bearings and having ground engaging wheels thereon, a sprocket on said rear axle intermediate the ends thereof, said body member also including spaced apart depending side portions, a pair of brackets fastened to the lower edges of said side portions, a shaft supported by said brackets and said shaft having foot pedals on its end, a clutch on said shaft and said clutch including a sprocket, an endless chain trained over said sprockets, a crank journaled in the front portion of said body member, chain and sprocket means connecting said shaft to said crank, said crank comprising a pair of offset portions, front legs having their upper ends swivelly connected to said offset portions, a front axle connected to the lower ends of said front legs, spaced apart horizontally disposed frame members extending between said front and rear axles, front wheels swivelly connected to the front axle, a bearing portion in the upper front portion of the body member, a rotary steering rod slidably engaging said bearing portions, a steering wheel connected to the upper end of said rod and arranged above said body member, and means operatively connecting the lower end of said rod to said front wheels.

2. In an amusement device, a hollow body member including a pair of spaced apart depending rear legs having bearings on their lower ends, a rear axle extending through said bearings and having ground engaging wheels thereon, a sprocket on said rear axle intermediate the ends thereof, said body member also including spaced apart depending side portions, a pair of brackets fastened to the lower edges of said side portions, a shaft supported by said brackets and said shaft having foot pedals on its end, a clutch on said shaft and said clutch including a sprocket, an endless chain trained over said sprockets, a crank journaled in the front portion of said body member, chain and sprocket means connecting said shafts to said crank, said crank comprising a pair of offset portions, front legs having their upper ends swivelly connected to said offset portions, a front axle connected to the lower ends of said front legs, spaced apart horizontally disposed frame members extending between said front and rear axles, front wheels swivelly connected to the front axle, a bearing portion in the upper front portion of the body member, a rotary steering rod slidably engaging said bearing portion, a steering wheel connected to the upper end of said rod and arranged above said body member, and means operatively connecting the lower end of said rod to said front wheels, whereby when the foot pedals are rotated, the rear wheels will be driven and at the same time the body member will pivot up and down on an axis extending through the rear axle.

3. The structure as defined in claim 2 wherein said body member has a configuration of an animal, and a saddle on the upper central portion of said body member.

4. In an amusement device, a rear axle having wheels thereon, a body member having rear legs rockably connected to said rear axle, front wheels spaced forwardly from the wheels on said rear axle, means operatively connecting said front wheels to said body member, a shaft rotatably supported below said body member and said shaft being operatively connected to said body member, a crank mounted for rotation on said body member and said crank being spaced forwardly and above said shaft, means operatively connecting said crank and shaft together, means operatively connecting said shaft and rear axle together, a pair of spaced apart front legs, a front axle having the lower ends of the front legs connected thereto, the upper ends of the front legs being swivelly connected to said crank, and means operatively connected to said shaft for rotating said shaft.

5. The structure as defined in claim 4 and further including steering means which is operative for steering the device regardless of the raised or lowered position of the body member.

References Cited in the file of this patent

UNITED STATES PATENTS

| | | |
|---|---|---|
| 2,770,463 | Battaglia et al. | Nov. 13, 1956 |
| 2,788,217 | Patterson | Apr. 9, 1957 |